Nov. 27, 1934. J. A. VOGEL ET AL 1,982,238
HONING DEVICE
Filed May 22, 1931 2 Sheets-Sheet 1

Witness:
William P. Kilroy

Inventors
Johannes A. Vogel
and George C. Warner
By Wm J Belt, Atty.

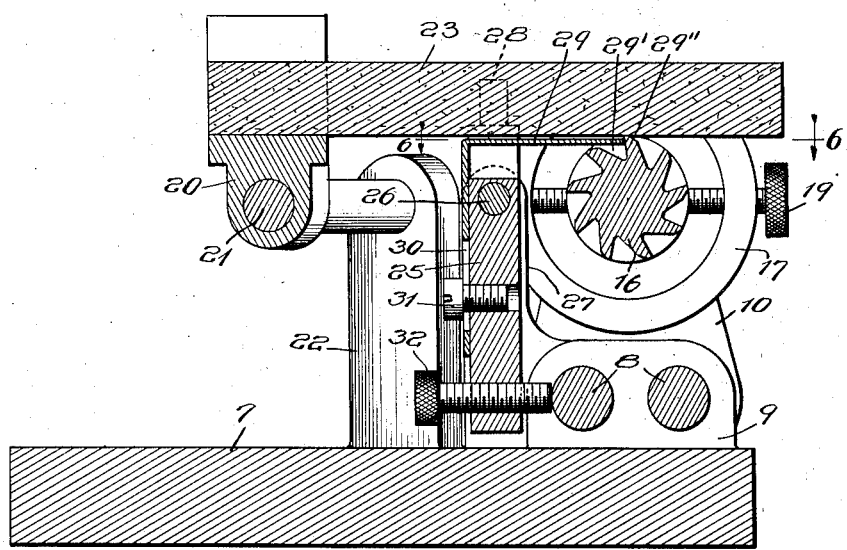
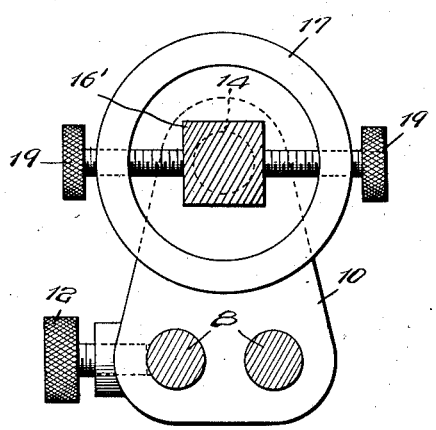
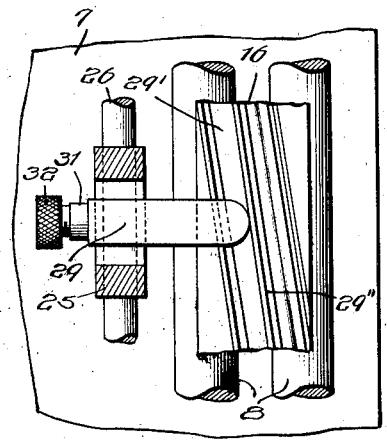

Patented Nov. 27, 1934

1,982,238

UNITED STATES PATENT OFFICE 1,982,238

HONING DEVICE

Johannes A. Vogel and George C. Warner, La Porte, Ind., assignors to The Deluxe Products Corporation, La Porte, Ind., a corporation of Indiana Application May 22, 1931, Serial No. 539,170

20 Claims. (Cl. 51—59)

This invention relates to machines for honing tools employed in machines used in machine shops such as reamers, milling cutters and the like to provide them with a sharp edge to give a smooth clean cut. We will describe the invention as used for honing spiral reamers, for which it is especially adapted, and this will make the construction, operation and benefits of the invention clearly understood; but it can be used for straight or single blade, or expansion reamers; or cutters as will be evident.

After a tool has been ground on a grinding machine the circular grinding of the tool face leaves a certain "hollow-ground" or concave surface on the circumferential face of the blades, and the blades usually have rough edges which must be removed to provide a sharp strong edge which will give a clean smooth cut otherwise the rough edge will impart a rough finish to the work. The sharpened edge of a tool starts to dull in use and if this dullness is arrested by honing, a much longer life will be imparted to the tool before grinding becomes necessary. Honing tools has heretofore been altogether a manual operation and it has required a high degree of skill because of the difficulties of honing the tool at the proper angle to remove the rough edge and to produce the continuous clean sharp cutting edge desired and required for good work. Consequently it has not been the practice to hone tools when this operation is desirable but it has been delayed until it becomes necessary, and often a tool is continued in use until it is necessary to send it to the grinding machine for grinding when prompt honing would have prolonged its life considerably. It has been customary, for example, to send straight reamers to a tool shop for grinding but spiral and expansion reamers must be sent to the factory because this work cannot ordinarily be done in shops.

The object of this invention is to provide a novel device which does not require especial skill but may be operated by any mechanic and which can be easily used for quickly honing tools to remove rough edges after grinding and to maintain tools with clean sharp edges in prime condition for work.

Other objects of the invention are to provide a device of simple an exceedingly economical construction adapted to conserve space, accomplish a high degree of efficiency, and which can be easily adjusted for honing different kinds of tools and operated without especial skill to maintain the cutting edge of a tool in prime working condition.

In the accompanying drawings illustrating a selected embodiment of the invention Fig. 1 is a top plan view of the device showing a spiral reamer set therein for honing.

Fig. 4 is an enlarged transverse sectional view on the line 4—4 of Fig. 1.

Fig. 5 is an enlarged transverse sectional view on the line 5—5 of Fig. 1.

Fig. 6 is a fragmentary sectional view on the line 6—6 of Fig. 4.

Figure 1:
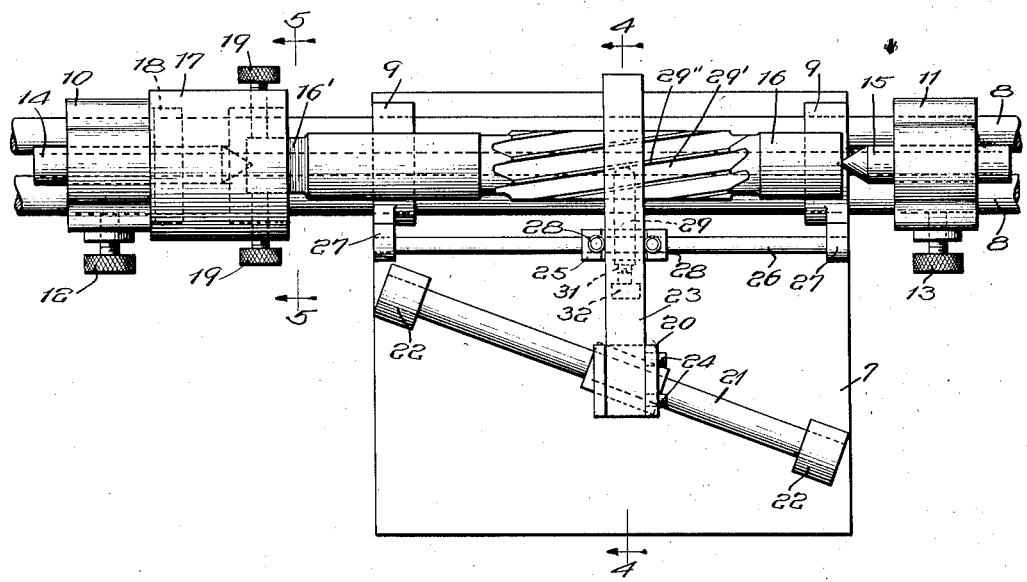
Figure 2:
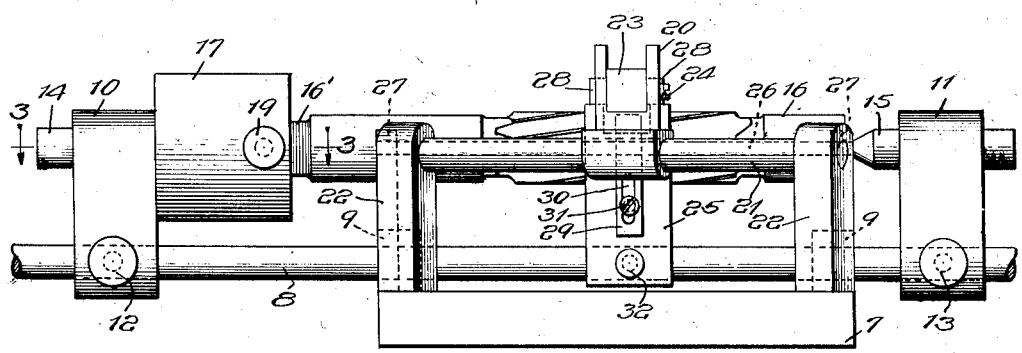
Fig. 2 is a front view of the device as shown in Fig. 1.
Figure 3:
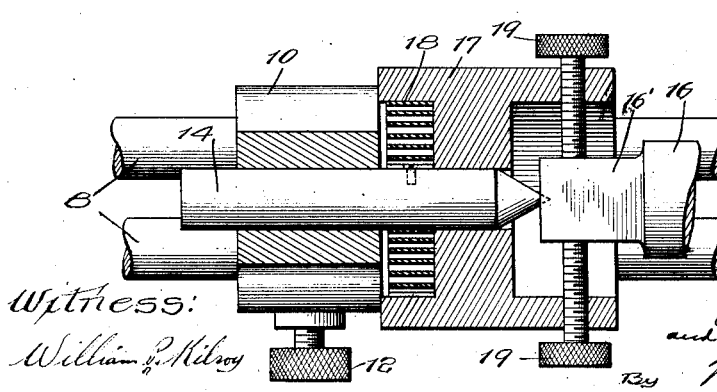
Fig. 3 is an enlarged sectional view on the line 3—3 of Fig. 2.

Referring to the drawings, 7 is a suitable base upon which all the other parts of the device are mounted. In a preferred form a pair of rods 8 are supported in parallel relation in lugs 9 on the base 7 and these rods carry centering blocks 10, 11 which are movably mounted on the rods and are secured in adjusted position thereon by set screws 12, 13 although any centering support may be used which may be found most adapted with the best approved means of adjustment. In the form here shown these centering blocks carry center pins 14, 15 in which the spiral reamer 16 is centered and held in operative position. A head or cap 17 is arranged on the center pin 14 and a spring 18 is housed in this head and has its inner end fastened to the center pin 14 and its outer end free. The surface of the free end of the spring engages the head or cap 17 with sufficient friction, as the tool rotates in one direction, for tensioning the spring to rotate the tool in the other direction, as hereafter explained. Set screws 19 are arranged in the head to engage the shank 16' of the reamer 16 to fasten the head rigidly to the reamer to turn therewith. A hone carrier 20 is slidably mounted on a rod 21 obliquely positioned with reference to the axis of the tool and which is supported at its ends by lugs 22 on the base 7. A hone 23 which may be square, round, or other form is adjustably fastened near one end in the hone carrier 20 by set screws 24 and it projects transversely across the reamer set in the device and rests upon a blade of the reamer as shown in Fig. 4. A traveler 25 is slidably mounted parallel with the axis of the tool on a rod 26 which is supported at its ends by lugs 27 on the base 7. Roller guides 28 are mounted on the traveler to engage opposite sides of the hone. The rod 21 is arranged obliquely to the axis of the reamer so that the hone is caused to move transversely across the reamer when the carrier 20 in which the hone is mounted is moved back and forth on this rod. The hone is moved manually longitudinally along the supporting rod 21 and by reason of the inclined position of this rod to the axis of the reamer the hone has a conjoint movement longitudinally and transversely of the reamer the hone being guided by the rod 21 serves to constrain the hone to a path oblique to the reamer which is most effective for the honing operation and distributes the contact of the hone with the reamer over a large area and avoids uneven wear in concentrated spots. In order to cause the hone to travel from end to end of the blade of a spiral reamer, we provide a finger 29, Figs. 4 and 6, which has a slot 30 to receive a set screw 31 by which the finger is adjustably mounted on the traveler 25. This finger is arranged to lie in a groove 29' of the reamer against the blade 29" to be honed. The hone rests between the guide rollers 28 on the traveler and the traveler is movably supported on the rod 26 parallel with the axis of the reamer so that if the hone is moved back and forth on its supporting rod 21, the traveler will be moved parallel with the reamer and the finger engaging the spiral blade 29" will cause the reamer to turn so that the edge of the blade from end to end thereof will always be maintained in proper position with respect to the hone for the honing operation. When the finger moves along the blade from its outer to its inner end, the reamer will be turned in one direction and will tension the spring 18 and when the finger is moved along the blade from its inner to its outer end, the reamer will be turned in the opposite direction by the spring so that the finger is maintained in constant contact with the blade being sharpened and the blade is being maintained in the longitudinal movements of both the hone and the finger in proper honing contact with the hone. To adjust the finger to the particular tool being honed, the traveler is pivotally mounted on its supporting rod 26 and it is provided with an adjusting screw 32 which projects therethrough to contact with a fixed part of the device such as a rod 8, Fig. 4. By adjusting this screw 32 the traveler is adjusted to position the finger in proper operative contact with the blade of any tool centered in the device and this adjustment enables tools of many different kinds and sizes to be honed in the device. For a tool with a straight blade the head should be turned manually to tension the spring sufficiently before the finger is engaged with the tool so that the blade will be maintained in operative engagement with the finger during the movement of the finger, and this may also be done with spiral blade tools if desired.

The invention provides a device of simple and novel construction which can be easily operated to hone tools of many sizes and varieties and provide the cutting blades thereof with a clean sharp edge. No especial skill is required to set up a tool in the device or to operate the device and therefore we believe it will be used by mechanics frequently to keep their tools in good working condition much like a barber keeps his razor in working condition by frequent stropping. This will prolong the use of the tool before grinding becomes necessary and it will improve the work because it enables a tool to be kept in sharp working condition. This improves the quality of the work, speeds the work, and reduces cost of manufacture.

While we have shown the invention in a simple embodiment for honing a spiral reamer, we do not thereby intend to restrict it to the particular construction and arrangement of parts shown and described but reserve the right to make all such changes as may be necessary and desirable to satisfy different conditions and within the scope of the following claims:

We claim:

1. A sharpening device comprising a support for revolvably centering a tool having spiral blades in position to be sharpened, a non-rotating sharpener initially positioned transverse of the tool and adapted to operate in contact with the tool reciprocally conjointly with a longitudinal movement, a sharpener guide mounting for constraining the sharpener to a path oblique to the axis of the tool cooperating with a travelling guide for determining the limit of rotation of the tool in one direction to maintain a blade in operative relation to the sharpener during its movement co-operating with a resilient rotating means comprised in a headstock attached to the tool for maintaining a blade in operative relation to the sharpener during its reciprocal movements.

2. The combination with a work holding head member, of means for rotating the head member in one direction, a fixed member, and a spring having one end fastened to one of said members and its other end frictionally engaging the other member and adapted to be tensioned by the movement of the head member in one direction to rotate the head member in the reverse direction.

3. The combination with a work holding head member, of means for rotating the head member in one direction, a fixed member, and a spring housed within the head member and having one end fastened to the fixed member and its other end frictionally engaging the head member and adapted to be tensioned by the movement of the head member in one direction to rotate the head member in the reverse direction.

4. A honing device for tools having longitudinal blades comprising means for rotatably centering the tool in position to be honed, a non-rotating hone reciprocally propelled normally positioned transversely of the tool, the said hone being mounted on a carrier slidable longitudinally of the tool, a hone mounting carrier track forming a guide for constraining the hone to a path oblique to the tool, a work rotating means for automatically imparting rotation to the tool and cooperating with a travelling guide means to constantly determine the limit of rotation of the tool and maintain a blade to be honed in operative position relative to the hone.

5. A honing device for tools having longitudinal blades and comprising means for rotatably centering the tool in position to be honed, means for rotating the tool in one direction, a non-rotating hone normally positioned transverse of the tool, the said hone being mounted on a carrier slidable longitudinally of the tool, a hone mounting carrier track forming a guide for constraining the hone to a path oblique to the tool, a traveller moving longitudinally of the tool and parallel therewith, and means on the traveller for guiding the tool to maintain the blade to be honed in operative position relative to the hone.

6. A honing device for tools having longitudinal blades and comprising means for rotatably centering the tool in position to be honed, means for rotating the tool in one direction, a non-rotating hone normally positioned transverse of the tool, the said hone being mounted on a carrier slidable on a track longitudinally of the tool, a hone mounting carrier track forming a guide for constraining the hone to a path oblique to the tool, a traveller moving longitudinally of the tool and parallel therewith, and a finger on the traveller engaging a blade of the tool for limiting the rotation of the tool to maintain the blade to be honed in operative position relative to the hone.

7. A honing device for tools having longitudinal blades and comprising means for rotatably centering the tool in position to be honed, means for rotating the tool in one direction, a non-rotating hone normally positioned transverse of the tool, the said hone being mounted on a carrier slidable on a track longitudinally of the tool, a hone mounting carrier track forming a guide for constraining the hone to a path oblique to the tool, a traveller moving longitudinally of the tool and parallel therewith, said hone having operative engagement with the traveller to move the traveller, and means on the traveller for determining the rotation of the tool during the movement of the hone to maintain the blades to be honed in operative position relative to the hone.

8. A honing device for tools having longitudinal blades and comprising means for rotatably centering the tool in position to be honed, means for rotating the tool in one direction, a non-rotating hone normally positioned transverse of the tool, the said hone being mounted on a carrier slidable track longitudinally of the tool, a hone mounting carrier track forming a guide for constraining the hone to a path oblique to the tool and parallel moving longitudinally of the tool and parallel therewith, said hone having operative engagement with the traveller to move the traveller, a finger on the traveller engaging a blade of the tool for determining the rotation of the tool to maintain the blade to be honed in operative position relative to the hone, and means on the traveller for adjusting the finger to operative relation with the blade to be engaged thereby.

9. A honing device for tools having spiral blades and comprising means for centering the tool in position to be honed, a non-rotating hone mounted on a slidable support adapted to move longitudinally of the tool, the hone being normally projected transversely of the tool, a hone support being slidably mounted at an oblique angle to the tool and constraining the hone to a path oblique to the tool, a traveller, a support for the traveller parallel with the tool, a finger on the traveller engaging a blade of the tool for rotating the tool to maintain the blade to be honed in operative position relative to the hone, and guides on the traveller engaged by the hone whereby the traveller is moved on its support longitudinally of the tool and parallel therewith during the conjoint movement of the traveller and the hone.

10. In combination supporting centers for mounting a cutting tool, a chuck revolvably mounted upon one of the centers having means for attachment to the tool, including resilient means fixed to the mounting on which the chuck revolves and having frictional engagement with the chuck to automatically revolve the tool, a guide member mounted to travel parallel with the tool and constantly regulate the revolution of the tool, an abrading member adapted to operate in constant contact with the tool and impel the guide member.

11. In combination, a base supporting centers for revolvably mounting a cutting tool, centers for supporting the tool, operably attached to one of the centers a chuck including means to revolve the tool, a non-rotary abrading member having means to maintain operative contact with the tool, a finger travelling in a plane parallel to the tool and at an oblique angle to the longitudinal travel of the abrading member automatically determining the successive operative positions of the abrading means on the tool, the chuck having means to automatically maintain a resilient pressure of the tool against the finger.

12. In combination a mounting for a rotatable tool having blades, a member attached to one portion of the mounting including means to automatically resiliently rotate the tool, a non-rotatable abrading means mounted to travel simultaneously longitudinally of and in transverse contact with the tool, the mounting constraining the abrasive means to a path oblique to the tool, a cooperating finger member travelling in a plane parallel to the tool having a means constantly determining the relative position of the abrading means in contact with the tool, whereby the abrading means and the tool surface with which it is in contact automatically change their relative points of contact constantly forward and in reverse.

13. In combination a base, a pair of centers adapted to support a tool having blades longitudinal thereof revolvably mounted between said centers, and a headstock attached to one of the centers having means for gripping contact with the tool to revolve the same, there being resilient means in the said headstock adapted to automatically revolve the tool in one direction; a bearing running longitudinally adjacent the tool and substantially parallel therewith, a traveller on said bearing carrying a guide to contact with the tool and maintain the tool at predetermined positions during operations on the tool; an abrading means for honing the tool mounted upon a traveller slidable upon a shaft positioned at an oblique angle to the tool, and having impelling contact with the travelling guide.

14. In combination, center supports for revolvably mounting a tool, a chuck operatively attached to one of the centers for resiliently revolving the tool, a traveller supporting a resistance guide in contact with the tool operably mounted to travel parallel with the tool and be actuated by and coactively with a honing means, a hone support slidably mounted to travel at an oblique angle to the axis of the tool and a hone mounted upon the hone support operatively projected over and in substantially transverse contact with the tool, the travelling guide constantly—forward and in reverse—determining in conjunction with the chuck the points of contact between the hone and a blade of the tool.

15. In combination supporting centers for mounting a revolvable object to be operated upon, a work holding headstock member rotatable on one center and comprising a spring with one end fixedly attached to the center and having a free end in frictional contact with a wall of the headstock member, the work holding head member being adapted to tension and automatically resiliently revolve the work in one direction and cooperate with a slidable guide offering resistance for various operative positions of the work.

16. A honing device comprising means for centering a tool having a blade in position to be honed, a non-rotating hone, means for supporting the hone for travel in oblique operative position to the blade, and a tool rotating means—including a spring—adapted to grip the tool and rotate it cooperating with a finger bearing traveller slidably mounted to move longitudinally along the reamer and form a guiding resistance to the tool rotating means to maintain the blade in operative position with respect to the hone as the hone is operated.

17. A honing device comprising means for centering a tool having a blade in position to be honed, a non-rotating hone, means for imparting to the hone a movement transversely of the tool conjointly with a movement of the hone longitudinally of the tool, means to constrain the hone to a path oblique to the tool and resilient means comprised in a headstock including a spring for rotating the tool during the operative movement of the hone cooperating with a slidably mounted traveller bearing a finger to move longitudinally in contact with the reamer and form a guiding resistance to the tool rotating means, to maintain the blade in proper operative position relative to the hone.

18. A honing device comprising means for centering a tool having a blade in position to be honed, a non-rotating hone adapted to be reciprocally continuously moved longitudinally of the tool, and a work holding member rotatably mounted on a center including resilient means, for rotating the tool cooperating with a slidably mounted traveller bearing a finger to move longitudinally in contact with the reamer and form a guiding resistance to the tool rotating means to maintain the blade in proper operative position with respect to the hone during the movement of the hone longitudinally of the tool, there being means for constraining the hone to a path oblique to the tool.

19. A mounting for revolvably supporting a reamer, a tool for sharpening the reamer transversely operable across the reamer and movable longitudinally of the reamer, a tool guide constraining the tool to a path oblique to the reamer, a second means gripping the reamer including a means revolvably mounted for revolving the reamer in one direction, a travelling means moved by the tool having a member in contact with the reamer coperating with the gripping means to position the reamer with relation to the tool.

20. In combination two tool supporting centers, one of said centers having mounted revolvably thereon a chambered tool controlling head, the said head comprising in the chamber a spring with one end fixedly attached to a center with the free end in frictional contact with the inner circumferential wall of the head, the tool controlling head being adapted to be tensioned by the resistance of the free end of the spring and automatically and resiliently revolve the work in one direction, a slidable guide having means to contact with the tool and offer resistance in reverse to the tensional pressure of the tool controlling head.

JOHANNES A. VOGEL.
GEORGE C. WARNER.